United States Patent
Allen et al.

(10) Patent No.: US 9,516,679 B2
(45) Date of Patent: *Dec. 6, 2016

(54) SYSTEMS AND METHODS FOR DYNAMIC AGGREGATION OF BANDWIDTH

(71) Applicant: AT&T Mobility II LLC, Atlanta, GA (US)

(72) Inventors: Todd W. Allen, Duvall, WA (US); Kevin W. Jones, St. Louis, MN (US)

(73) Assignee: AT&T Mobility II LLC, Atlanta, GA (US)

(*) Notice: Subject to any disclaimer, the term of this patent is extended or adjusted under 35 U.S.C. 154(b) by 269 days.

This patent is subject to a terminal disclaimer.

(21) Appl. No.: 13/849,743

(22) Filed: Mar. 25, 2013

(65) Prior Publication Data
US 2013/0223346 A1 Aug. 29, 2013
US 2016/0295615 A9 Oct. 6, 2016

Related U.S. Application Data

(63) Continuation of application No. 12/862,093, filed on Aug. 24, 2010, now Pat. No. 8,406,778, which is a
(Continued)

(51) Int. Cl.
*H04W 76/02* (2009.01)
*H04W 72/12* (2009.01)
*H04W 28/20* (2009.01)

(52) U.S. Cl.
CPC .......... *H04W 76/02* (2013.01); *H04W 72/121* (2013.01); *H04W 28/20* (2013.01); *H04W 76/025* (2013.01)

(58) Field of Classification Search
CPC ...... H04W 76/00; H04W 76/02; H04W 28/20; H04W 72/121; H04W 76/025
(Continued)

(56) References Cited

U.S. PATENT DOCUMENTS 6,850,502 B1 2/2005 Kagan et al.
7,003,313 B2 2/2006 Garces et al.
(Continued)

OTHER PUBLICATIONS

U.S. Office Action dated Jun. 29, 2012 in U.S. Appl. No. 12/862,093.
(Continued)

*Primary Examiner* — Andrew Lai
*Assistant Examiner* — Sumitra Ganguly
(74) *Attorney, Agent, or Firm* — Hartman & Citrin LLC

(57) ABSTRACT

Systems and methods are presented for the dynamic aggregation of communications network bandwidth. Communication devices are bonded in a community in which the communication resources of a bonded device can be used to transfer data on behalf of another bonded device. In an exemplary embodiment, communication devices are bonded wirelessly to share wireless wide area network communication channels. Bandwidth aggregation is performed dynamically based on user communication requirements and the current states of the bonded communication devices. Methods are presented by which communication devices can be automatically bonded when a predetermined bonding condition is satisfied. The methods and systems of the invention optimize utilization of communication resources in a cost-effective manner that provides a user high quality service as well as location mobility.

20 Claims, 8 Drawing Sheets

Related U.S. Application Data continuation of application No. 11/383,787, filed on May 17, 2006, now Pat. No. 7,805,156.

(58) Field of Classification Search
USPC .......................................... 370/235, 328, 329
See application file for complete search history.

(56) References Cited

U.S. PATENT DOCUMENTS

| | | | |
|---|---|---|---|
| 7,860,081 B2 | 12/2010 | Dawson et al. | |
| 7,894,470 B2 | 2/2011 | Ruckart et al. | |
| 8,406,778 B2 * | 3/2013 | Allen .................... | H04W 76/02 370/329 |
| 2004/0077345 A1 | 4/2004 | Turner et al. | |
| 2005/0114534 A1 * | 5/2005 | Lee .................... | H04L 67/1002 709/230 |
| 2005/0208949 A1 | 9/2005 | Chiueh | |
| 2006/0039367 A1 | 2/2006 | Wright et al. | |
| 2006/0041688 A1 | 2/2006 | Wright et al. | |
| 2006/0199567 A1 | 9/2006 | Alston | |
| 2006/0200557 A1 | 9/2006 | Slemmer et al. | |
| 2007/0030857 A1 | 2/2007 | Fulknier et al. | |
| 2008/0298283 A1 | 12/2008 | Dawson et al. | |
| 2009/0034458 A1 | 2/2009 | Horn et al. | |
| 2009/0215411 A1 * | 8/2009 | Tucker .................... | H04W 4/10 455/90.2 |

OTHER PUBLICATIONS

U.S. Notice of Allowance dated Nov. 29, 2012 in U.S. Appl. No. 12/862,093.
U.S. Office Action dated Jul. 17, 2009 in U.S. Appl. No. 11/383,787.
U.S. Office Action dated Jan. 19, 2010 in U.S. Appl. No. 11/383,787.
U.S. Notice of Allowance dated Jun. 7, 2010 in U.S. Appl. No. 11/383,787.
U.S. Office Action dated Jun. 28, 2010 in U.S. Appl. No. 11/837,927.
U.S. Notice of Allowance dated Oct. 20, 2010 in U.S. Appl. No. 11/837,927.
U.S. Office Action dated Nov. 26, 2012 in U.S. Appl. No. 13/011,585.
U.S. Office Action dated Mar. 19, 2013 in U.S. Appl. No. 13/011,585.
U.S. Office Action dated Jul. 22, 2013 in U.S. Appl. No. 13/011,585.
U.S. Notice of Allowance dated Oct. 4, 2013 in U.S. Appl. No. 13/011,585.
U.S. Notice of Allowance dated Jan. 23, 2014 in U.S. Appl. No. 13/011,585.
U.S. Office Action dated Apr. 7, 2015 in U.S. Appl. No. 14/187,767.
U.S. Notice of Allowance dated Oct. 19, 2015 in U.S. Appl. No. 14/187,767.
blogrunner, [online]; [retrieved on Apr. 20, 2006]; retrieved from the Internet at http://annotatedtimes.blogrunner.com/ snapshol/D/4/6/43CB4DE107E9E946/.

* cited by examiner

SYSTEMS AND METHODS FOR DYNAMIC AGGREGATION OF BANDWIDTH

CROSS-REFERENCE TO RELATED APPLICATIONS

This application is a continuation of U.S. patent application Ser. No. 12/862,093, filed Aug. 24, 2010, now U.S. Pat. No. 8,406,778, which is a continuation of U.S. patent application Ser. No. 11/383,787, filed May 17, 2006, now U.S. Pat. No. 7,805,156.

FIELD OF INVENTION

The present invention relates to systems and methods for aggregating communication resources to achieve an increased communication bandwidth.

BACKGROUND

Because data network connectivity is considered essential in a majority of businesses and enterprises, most companies provide some type of wide area network (WAN) connection, such as an Internet connection, to their employees. Often the WAN connection is provided in the employee's office at the company's business location. For enterprises that operate field or sales offices, those remote sites may also be wired for internet connectivity, even though the offices may have few if any employees present on a regular basis. In addition, many employees, for example sales representatives or service technicians, are required to spend a significant amount of time traveling outside the office. To accommodate these employees, an employer may also provide wireless internet access via subscription to a Wireless WAN (WWAN). Consequently an enterprise may incur costs for three types of internet connections: principal business location connectivity, remote site connectivity, and wireless connectivity for mobility, even though a fair portion of the resources may remain underutilized or idle. Thus, from a business operations perspective, it would be desirable to maximize utilization of the WAN resources while ensuring that users have access to the resources they need to productively conduct company business.

As mentioned above, many enterprises provide wireless mobile connectivity for their employees. With the continued growth in the use of laptops, personal digital assistants (PDAs), handheld computers and other wireless devices, Wireless Wide Area Networks (WWANs) are playing an increasingly significant role in facilitating communications around the globe. Unlike Wireless Fidelity (Wi-Fi) networks that provide wireless communication in accordance with IEEE 802.11(a), (b) and (g) protocols within a limited geographical area, for example within a building, WWANs use cellular technology to provide wireless transfer of data over large geographical areas via communication protocols that include encryption schemes that provide secure communications. Devices that communicate over WWANs have a built in radio that allows them to transmit and receive data over the wireless network.

The WWAN bandwidth available to a user is dependent on the type of cellular network and the signal strength at the user's location. There are several types of WWANs in operation today, the General Packet Radio Service (GPRS), the Enhanced Data GSM Environment (EDGE), the Universal Mobile Telecommunication System (UMTS) and the High Speed Downlink Packet Access (HSDPA), to name a few. A user with an EDGE card that enables communication over the EDGE network can typically be allocated a bandwidth of 100 kbs. UMTS subscribers can receive 250-300 kbps of bandwidth, while HSGPA subscribers can be allocated 500-700 kbs of bandwidth by the network provider. Although the bandwidth allocated by the carrier network to an individual subscriber can be sufficient to nominally support the user's communication needs, there are some applications that can demand a higher bandwidth than that allocated by the network in order to operate at a desired quality of service. For example the user may wish to participate in a videoconference which typically requires high data rates. For these applications the network bandwidth allocated to the user can be insufficient to support the desired application, or may support it in a slow or degraded manner that the user deems unacceptable. Consequently, although the user may enjoy the mobility that a WWAN offers, he can be stymied in his attempt to use the WWAN to conduct the operations that he desires. It would be advantageous to the user to be able to increase his bandwidth when necessary to accommodate high data rate applications.

A user can obtain higher data rates, on the order of 7 Mbps for the 802.11(b) protocol, and up to around 50 Mbps under 802.11(a) and (g) protocols, by connecting to a Wi-Fi network. Communication over a Wi-Fi network requires that a user's laptop, PDA, or other mobile device to be equipped with a Wi-Fi radio and also requires that a user have access to a Wi-Fi hotspot. Although Wi-Fi networks have been operable for many years, the number of hotspot locations remains disappointingly limited; consequently, users may not be assured of hotspot access at a particular location. Often deployed in airports, hotels, or other public venues, hotspot locations are prone to becoming congested, resulting in degraded performance, or even loss of access when a maximum number of users has been reached. In addition, when accessing a public hotspot the security of the communications conducted may prove to be a legitimate concern, particularly for a user conducting company business. Finally, a further disadvantage of using a Wi-Fi network for high data rate Internet access is that a Wi-Fi network operates within a much smaller coverage area, requiring a user to be within close proximity of a hotspot, and thereby limiting the mobility of a user.

In the past, bandwidths have been increased for devices by aggregating multiple wired connections. For example three 56.6 kbps modems can be linked to provide an aggregated bandwidth of 169.8 kbps. However the maximum bandwidth acquired is limited by the number of physical connections available. Further, aggregation performed in this manner is static, rather than dynamic in response to user needs. More importantly, aggregation of wired connections provides increased bandwidth only to users communicatively coupled with the wired connections. For example, a host can be coupled to the aggregated connections and users access the bandwidth via the host. Consequently, bandwidth aggregated in this manner does not address the increased bandwidth needs of mobile, wireless users.

A further consideration related to providing Internet connectivity is the fact that an internet connection, while being paid for by the subscriber, can actually be idle, i.e. not used for data transfer, for a considerable amount of time. There are two primary reasons for this idle state: (1) the device is not being used by the user, and (2) the device is being used, but the device is not actively engaged in the transfer of data over the connection. This is because a user will often download a web page or file, which may take only a few seconds, then spend several minutes perusing the loaded page. Consequently, within a particular enterprise, one employee may be reading a web page while his WAN connection remains idle. Meanwhile, other employees may wish to engage in sessions that require high data rates, such as videoconferences, but are unable to do so because their WAN connections will not support the high data rate required to conduct the conference. Thus, while one employee has access to resources that he does not currently need, another employee has insufficient resources to perform a desired operation.

Therefore, there is a need for systems and methods that dynamically increase the bandwidth available to a user in response to a user's communications requirements. There is also a need for systems and methods that dynamically optimize the utilization of network resources in a cost-effective manner. Finally, there is a need for systems and methods that provide a user high quality communication services along with location mobility.

SUMMARY

The present invention provides systems, methods, and apparatus, for bonding a community of devices and dynamically aggregating the wide-area network (WAN) bandwidths of the bonded devices.

In one embodiment, a system according to the present invention can include a control network adapted to dynamically aggregate bandwidth within a community of bonded communication devices in accordance with a predetermined aggregation scheme, and a payload network communicatively coupled to the control network and adapted to receive data from and deliver data to the control network. The control network can comprise at least two bonded communication devices adapted to send and receive data over a wide area communication network channel, and also include a network controller adapted to dynamically aggregate bandwidth among the community of bonded devices in accordance with a predetermined scheme. The wide area communication network channel can comprise a wireless wide area communication channel. The predetermined scheme can be based on a geographical location or based on a temporal condition. The system can include an egress network communicatively coupled to the payload network and adapted to receive data from and deliver data to the payload network.

In one embodiment, A method according to the present invention includes bonding at least two communication devices adapted to communicate over a wide area network communication channel, and dynamically aggregating the wide area network communication channels of the bonded communication devices in accordance with a predetermined scheme.

In one embodiment, an apparatus according to the present invention includes, a communications module adapted to communicate with at least one bonded communications device, and a processor module coupled to the communications module and adapted to perform multiplexing operations.

DETAILED DESCRIPTION

Figure 1:
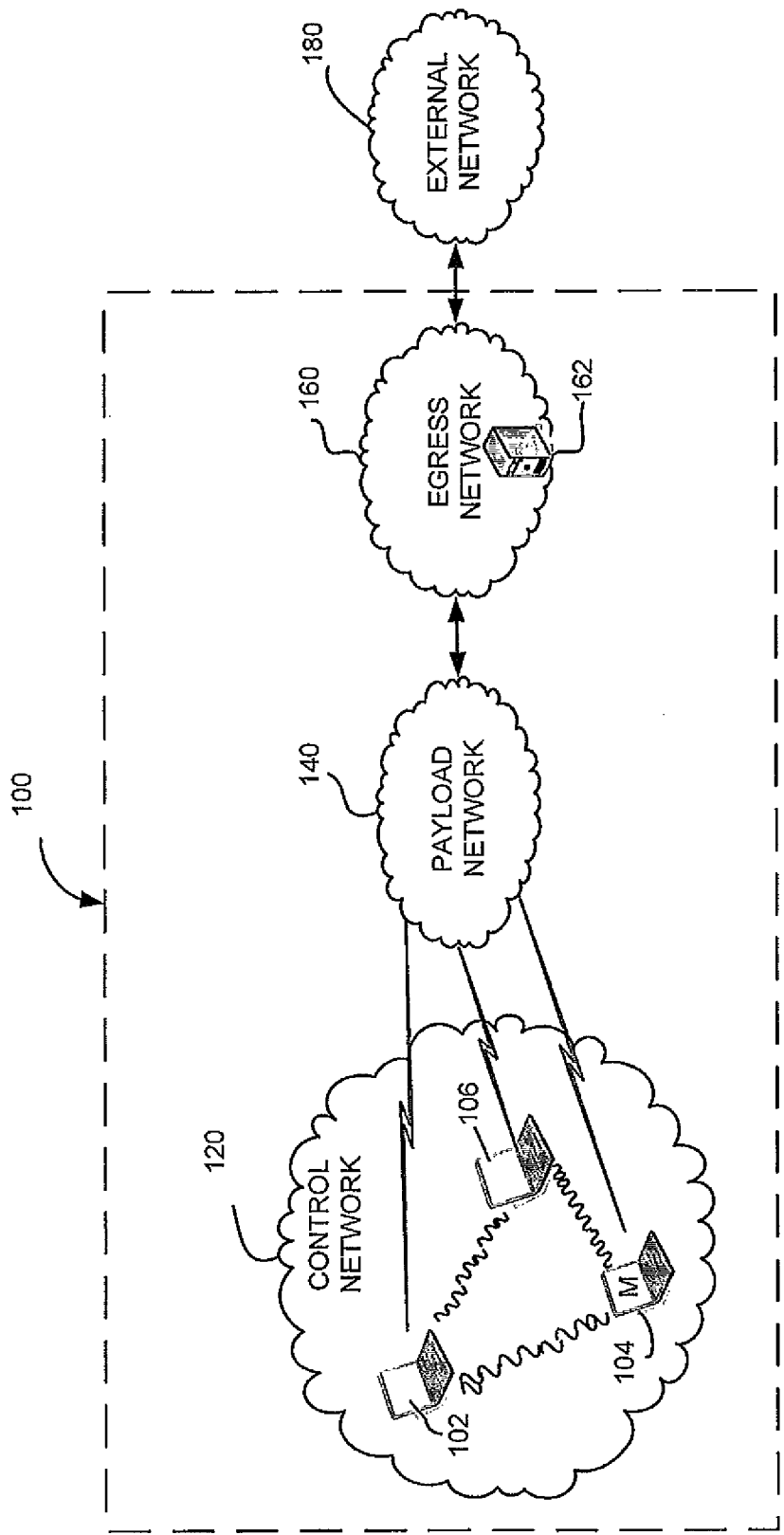
FIG. 1 illustrates an exemplary embodiment of a system for bandwidth aggregation in accordance with the present invention.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The present invention provides systems, methods, and apparatus, for bonding a community of devices and dynamically aggregating the wide-area network (WAN) bandwidths of the bonded devices. The WAN bandwidths are dynamically aggregated in response to user communication requirements and device states within the bonded community. In exemplary embodiments, the aggregated WAN bandwidths are wireless bandwidths provided by WWANs and the dynamic aggregation of WWAN bandwidths is performed wirelessly. Dynamic aggregation of WAN bandwidths is achieved by using the WAN connection of a first community member to transfer data on behalf of one or more other community member devices, allowing an individual device within the community to effectively realize a higher WAN bandwidth than that supplied by the device's own individual WAN connection. Exemplary embodiments of the invention can include: a control network that includes a bonded community of devices and the communication links among them and manages data transmissions into and out of the community; a payload network communicatively coupled to the community of devices which provides wide area network communication capacity to the community of wireless devices, and an egress network communicatively coupled to the payload network which receives and processes the data transmitted over the payload network. The egress network can forward the data to an external network such as a corporate intranet or the internet.

An exemplary method of the invention includes: bonding a community of devices, dynamically aggregating the WAN channels of the bonded community according to device states and communication requirements and dynamically releasing the WAN channels of the bonded community in response to device states and communication requirements.

The bonding of a community of devices is performed by coupling the devices in a community governed by a control network which facilitates the sharing of WAN connections among the member devices. A bonded community in accordance with the invention is referred to as a Wireless Aggregation for Mobility (WAM) Object or WAMO, and bonded members are referred to as WAMMERs. In an exemplary embodiment of the invention, a WAMO can include laptop computers, PDAs, handheld computers or other wireless electronic devices configured for communication over data networks. A WAM client installed on the device directs and facilitates WAM related operations by the device. WAMMER devices within a WAMO can be communicatively coupled by any means including wired, wireless and fiber optic architectures including, but not limited to Wi-Fi, infrared, Bluetooth, Ultrawideband, WiMax, LAN, MAN, WAN, or other networks.

There are several schemes by which the bonding of separate electronic devices can be achieved. In a first embodiment of the invention, individuals can voluntarily form an ad hoc WAMO. An example of an ad hoc WAMO in accordance with an exemplary embodiment of the invention is a collection of WAM client-equipped wireless devices gathered at a public venue such as a coffee shop or an airport. Although the device users may be unrelated strangers that subscribe to various unrelated WWAN's, the users can congregate, establish their WWAN connections and start their WAM clients. The WAM client can configure a connection for peer-peer communication with other devices in the area and signal that the device is available to join a WAMO in which the WWAN bandwidths of the WAMMERs can be aggregated and shared. In exemplary embodiments of ad hoc WAMOs, peer-peer connections can be established by Wi-Fi, Bluetooth, infrared, or other wireless means. A registration process executed by the WAM client allows a device to join a WAMO. A WAMMER of an ad hoc WAMO can leave the WAMO at any time, thereby becoming unbonded to the community, in which case his WAN bandwidth can no longer be aggregated. A WAMO in which any WAM-equipped user can voluntarily participate is referred to as an open WAMO because there are no membership restrictions.

In a further exemplary method of the invention, a WAMO can be formed from a group of employees, each of whom has employer-provided access to a WWAN. For example, each user can have a wireless device equipped with an EDGE card. The group of employees can be sales representatives that meet at a remote office that does not provide WAN access. In an exemplary method of the invention, the group of employees can form a WAMO by powering on their wireless devices, establishing WWAN connections and enabling the WAM clients installed on the devices. A WAMO established for the benefit of the employees of an enterprise can be closed, meaning that users must satisfy predetermined identity or membership requirements in order to participate.

A further embodiment of the invention provides a scheme for automatically bonding a group of devices based on the satisfaction of predetermined conditions. For example, an enterprise can require employees to participate in a WAMO while they are at a particular office location. In this case, when an employee arrives at the location and powers on his electronic device, the WAM client can automatically register the device with an on-site WAMO because the geographical condition for WAMO membership has been satisfied. Alternatively, an employer can establish temporal conditions for WAMO membership; for example, employees can be required to participate in a corporate WAMO between the hours of 8:00 am and 5:00 pm daily, so that employees that power on devices during those hours will find themselves automatically enrolled in a corporate WAMO. Authorization schemes can vary with the wants and needs of the enterprise, and the enterprise can operate several WAMOs with various membership requirements. A method for automatically bonding a communication device can include: providing a predetermined condition for bonding, bonding communication devices when the condition is satisfied, and releasing the communication devices from a bonded state when the condition is no longer satisfied. In an exemplary embodiment a user can be given the opportunity to remain bonded when the condition is no longer satisfied. Further, the user can be free to bond with a separate WAMO when released from a first WAMO. In addition, an exemplary embodiment of the invention allows a communication device to be concurrently bonded to multiple WAMOs.

A communication device can bond with other communication devices in a WAMO by being coupled in a control network that facilitates aggregation and sharing of communication channels. Bonding with an open or closed WAMO can begin with a registration process. In a first exemplary embodiment, the registration process can be conducted by a registration server within the control network. For example, the registration server can be maintained by a WAM client on a WAMMER or be maintained at a dedicated device within the WAMO. However, the registration process can also be performed by a registration server on the egress network. The registration server can maintain the current WAMO membership as well as the states of the bonded members, or WAMMERs, within the WAMO. The registration server can provide information to a WAMMER that facilitates establishing communication links that couple the WAMMER to the WAMO control network, thereby bonding the WAMMER.

Once a community of devices has been bonded together to form a WAMO, the aggregation and sharing of bandwidth among them can be implemented. An exemplary method of the invention for aggregating bandwidth includes: bonding communication devices, receiving traffic data associated with a WAMMER, multiplexing the traffic data, delivering the multiplexed data to a payload network, receiving the multiplexed data from a payload network, and reassembling the traffic data. Bandwidth aggregation can be implemented to accommodate data flow out of, i.e. uploaded from, or into, i.e. downloaded to, a WAMO.

The transfer of data to or from a WAMMER is coordinated by a control network. In an exemplary embodiment of the invention, a control network can include a WAMO controller, referred to as a WAMBO, communicatively coupled to each WAMMER within the WAMO. The WAMBO can be a dedicated device, or it can be WAMMER that is designated as the master device within the WAMO. A WAMMER designated as a WAMBO is equipped to conduct the bandwidth aggregation process. For example, a WAMMER can have a WAM module installed that enables the WAMMER to perform bandwidth aggregation operations. The aggregation process can begin with a WAMMER that desires to send data, for example a WAMMER can desire to perform a file transfer. In a first exemplary method, the WAMMER desiring to send traffic data can query the WAMBO for the current states of the WAMMERs in the WAMO. The WAMBO can receive the status query, check the states of the current WAMMERs and send a message back to the requesting WAMMER with the state information and the load share that each WAMMER can support. The requesting WAMMER can then multiplex, or parcel out, its traffic data to various WAMMERs in the WAMO. In exemplary embodiments the data traffic is parceled out as data packets. The WAMMERs can accrue the data packets sent to them from fellow WAMMERs and transmit them over the payload network; i.e. each WAMMER sends data packets over its WAN connection. In a further exemplary embodiment, all outgoing data can be sent to the WAMBO, which formats the data into data packets and multiplexes the data packets among the WAMMERs in accordance with state information. In yet a further embodiment, a control network can function without a WAMBO. In this embodiment each WAMMER examines WAMMER state information, and each WAMMER multiplexes its traffic data among other WAMMERs in accordance with the state information. WAMMERs that receive outgoing data packets transmit the packets over the payload network.

In an exemplary embodiment, the WAMO control network ensures that when needed, each WAMMER receives the bandwidth allocated by its WAN, so that aggregation does not prevent a user from using his own bandwidth for his own needs. A priority scheme can be established for cases in which multiple WAMMERs desire to send data and the aggregated bandwidth is insufficient to support all the WAMMER needs simultaneously. For example, bandwidth could be allocated according to a temporal priority, granting resources on a first-come first-serve basis, or a latency priority where resources are allotted based on the type of application so that a WAMMER requesting bandwidth for a video conference would be given priority over a WAMMER requesting bandwidth for a file transfer. WAMMERs denied aggregated bandwidth can be queued to receive bandwidth when resources become available.

The payload network transports data to and from a WAMO. In exemplary embodiments of the invention, the payload network is formed from the Wide Area Network (WAN) connections of the WAMMERs, and can be shared among the WAMMERs. The payload network bandwidth can be supplied by wired or wireless WANs or a combination thereof. For example, a WAMO can include three WAMMERs that have UMTS connections, two WAMMERs that use wired Asynchronous Transfer Mode (ATM) Network connections, and four WAMMERs with EDGE Network connections. The bandwidth supplied by all nine connections constitutes the payload network which can be aggregated and shared among the WAMMERs. For outbound traffic, the payload network transports the data packets from the WAMMERs to the egress network. For incoming traffic, the payload network receives data packets from the egress network and delivers them to the WAMMERs which in turn can deliver them to the control network. After data has been transferred to or from the control network, the aggregation of the WAMMER WAN connections is dissolved. Thus the aggregation of bandwidth in accordance with the invention is performed dynamically in response to user needs and device states.

The role of the egress network is to combine and regulate WAMMER data flows between the payload network and an external network. For outbound data from a WAMO, the egress network can receive the WAMO data from the payload network, process the data, and forward the data to an external network. In exemplary embodiments the egress network can be managed by a WAMO Manager or WAMMAN, which can be a server application. The WAMMAN can be located at the carrier WAN, or can be located at an enterprise network, either in front of or behind a firewall. The WAMMAN can maintain records on current WAMMERs and can manage more than one WAMO. The WAMMAN can receive the data packets from the payload network and buffer them for each WAMMER. From the buffered data packets, the WAMMAN can reassemble the data streams prior to forwarding the data to an external network such as a corporate intranet or the Internet. In a further exemplary embodiment, the system of the present invention can function without an egress network when the control network delivers data to a payload network that in turn delivers them to an external network such as the internet.

For the case in which data is downloaded to a WAMMER within a WAMO, traffic data can originate at an external network such as a corporate intranet. A WAMMAN on the egress network can receive the data from an external network, multiplex the data among the WAMMERs within a WAMO in accordance with WAMMER state information, and send the multiplexed data over the payload network to the WAMMERs. Data packets received at a WAMMER that are intended for one or more fellow WAMMERs can be sent to the appropriate WAMMER. In one embodiment, the data packets can be sent directly from one WAMMER to another WAMMER. In a further embodiment, data packets received at a WAMMER can be sent to the WAMBO which sends the data packets to the appropriate WAMMER. After data packets have been transferred over the payload network, the connections are no longer aggregated.

In an exemplary embodiment, the present invention includes an apparatus to perform WAMBO functions for a WAMO and operate as a dedicated device. The dedicated device can include software instructions for WAMBO operations, a database for storing WAMMER state information, a communications module to facilitate communications with WAMMERs in the WAMO and a controller to coordinate device operation. The communications module can contain circuitry to allow the dedicated device to communicate with WAMMERs via wired or wireless or fiber optic connections.

The present invention provides systems, methods and apparatus for dynamically aggregating WAN bandwidth within a community of electronic communication devices in order to effectively increase the bandwidth at a particular device within the community. The present invention is particularly applicable to aggregating wireless bandwidth provided by the WWAN connections of a bonded community of devices. The systems and methods of the invention facilitate maximizing the utilization of WAN resources in a cost-effective manner while providing users with the bandwidth necessary to conduct desired operations.

Generally speaking, the systems and methods described herein are directed toward the dynamic aggregation of bandwidth within a community of bonded communication devices, based on the bandwidth needs of the users and the states of the bonded communication devices. The present invention provides systems, methods and apparatus for bonding a community of communication devices and dynamically aggregating the WAN bandwidth provided to the bonded devices. Bandwidth is dynamically aggregated based on user communication requirements and current device states within the bonded community. The methods of the present invention allow an individual device within the bonded community to effectively realize a higher WAN bandwidth than that supplied by the device's own individual WAN connection. Outgoing data originating at a first device within the bonded community can be multiplexed among the bonded devices, which in turn transmit the data over their WAN connections. Similarly, a first bonded device can receive incoming data over its WAN connection for a second bonded device and forward the data to the second bonded device, so that the second bonded device effectively achieves a higher download data rate. In this manner the present invention provides dynamic aggregation of WAN bandwidth on an as-needed basis so that a user is able to perform desired high data rate operations.

Referring now to the drawings, wherein like numerals represent like elements throughout, FIG. 1 illustrates a system for dynamic aggregation of bandwidth 100 in the form of a Wireless Aggregation for Mobility (WAM) system. The exemplary system 100 can include three networks: a control network 120, a payload network 140, and an egress network 160. Data can originate at the control network 120, be delivered to the payload network 140 and subsequently be delivered to the egress network 160, where it can be received and processed. The egress network 160 can forward the data to an external network 180, such a corporate intranet or the internet. Similarly, data can be sent from the external network 180, and received at the egress network 160, where it can be processed and sent over the payload network 140 to the control network 120.

The control network 120 includes the bonded WAMMERs 102, 104, and 106 as well as the communication links between them, which are denoted as waves in the drawing. In the control network 120, each WAMMER is operating a WAN connection, as illustrated by the communication links between the control network 120 and the payload network 140. Via the control network 120, the WAN connection of a first WAMMER, for example WAMMER 106, can be used to transmit receive data on behalf of a second WAMMER, for example WAMMER 104.

The payload network 140 can transport data between the control network 120 and the egress network 160. In exemplary embodiments of the invention, the payload network 140 is formed from the Wide Area Network (WAN) connections of the WAMMERs 102, 104 and 106, and can be shared among them. The payload network bandwidth can be supplied by wired or wireless WANs or a combination thereof, since the payload network 140 need not be homogeneous. The payload network 140 can be the aggregation of the individual WAMMER bandwidths.

The egress network 160 can be communicatively coupled to the payload network 140. The egress network 160 can receive the data sent by the control network 120 over the payload network 140. At the egress network 160, the data can be buffered and processed. The data can then be delivered to an external network 180, such as a corporate intranet or the internet. In exemplary embodiments the egress network 160 is managed by a WAMO Manager or WAMMAN 162, which can be a server application, as shown in FIG. 1. The WAMMAN 162 can receive data from the payload network 140, and buffer and process it prior to forwarding the data to an external network 180. The WAMMAN 162 can also receive data from the external network 180 and send the data over the payload network 140 to the WAMMERs 102, 104, and 106. The WAMMAN 162 maintains records on current WAMMERs and can manage one or more WAMOs.

Figure 2A:
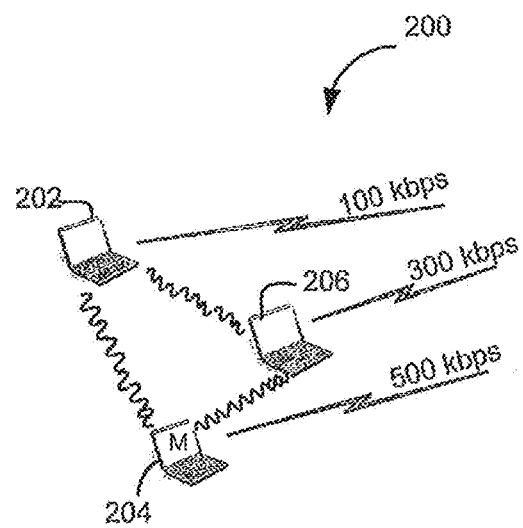
FIG. 2A illustrates an exemplary embodiment of a system in accordance with the invention.

A control network in accordance with the present invention governs and facilitates the sharing of WAN connections among the bonded devices or WAMMERs of a WAMO. A communication device can become bonded by coupling to a control network that enables a WAN connection of a first communication device to be used to transmit or receive data for a second communication device. In an exemplary embodiment of the invention, a WAMMER can be a laptop computer, PDA, handheld computer or other wireless electronic device configured for communication over data networks. A WAM client installed on the WAMMER can direct and facilitate WAM related operations by the device. There are various schemes by which the bonding of separate electronic devices to form a WAMO governed by a control network can be achieved. FIG. 2A illustrates a first embodiment of the invention in which individuals can voluntarily form an ad hoc WAMO. An example of an ad hoc WAMO in accordance with an exemplary embodiment of the invention is a collection of WAM client-equipped wireless devices gathered at a public venue such as a coffee shop or an airport. The device users can be unrelated strangers that subscribe to various unrelated WWAN's. Referring to FIG. 2A, an ad hoc WAMO 200 is shown that includes WAMMERs 202, 204, and 206. WAMMER 202 has an EDGE card that allows him a bandwidth of 100 kbps over the EDGE network. WAMMER 204 subscribes to the UMTS network and has access to a 300 kbps bandwidth, while WAMMER 206 has an HSDPA connection that provides 500 kbps of bandwidth.

The users of WAMMERs 202, 204 and 206 can congregate, establish their WWAN connections and start their WAM clients. The WAM client can configure a connection for peer-peer communication with other devices in the area and signal that the device is available to join a WAMO. In exemplary embodiments of an ad hoc WAMO, peer-peer connections can be established by Wi-Fi, Bluetooth, infrared, or other wireless means. A registration process executed by the WAM client can allow the device to become bonded to the other devices within the WAMO. In the WAMO 200, WAMBO control and aggregation functions are performed by the WAMMER 204 which is designated as a master WAMMER, as indicated by the letter M. However, an ad hoc WAMO can also operate without a master WAMMER, in which case control and aggregation functions can be performed at each WAMMER. A WAMMER of an ad hoc WAMO such as WAMO 200 can be free to leave the WAMO at any time. A WAMO in which any WAM-equipped user can voluntarily participate is referred to as an open WAMO as there are no membership restrictions.

Figure 2B:
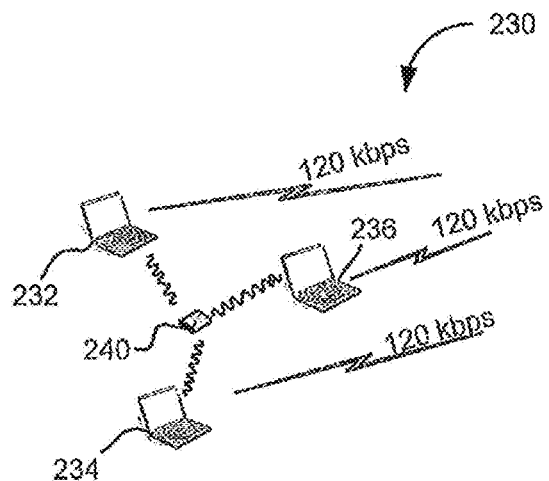
FIG. 2B illustrates an exemplary embodiment of a system in accordance with the invention.

In a further exemplary embodiment of the invention shown in FIG. 2B, a control network 230 can be used to bond a group of employees, each of whom has corporate-provided access to a WWAN. For example, each employee can have a wireless device equipped with an EDGE card that supplies 120 kbps of bandwidth. The group of employees can be sales representatives that meet at a remote office that does not provide WAN access. In an exemplary embodiment of the invention, the group of employees can power on their wireless devices, establish WWAN connections, enable the WAM clients installed on the devices, and choose to bond in a WAMO. Via a WAMO registration process, WAMMERs 232, 234 and 236 can form a WAMO and share an aggregated bandwidth of 360 kbps. In the control network 230 WAMO control functions are performed by a dedicated device 240 which is communicatively coupled to each WAMMER. A WAMO established for the benefit of the employees of an enterprise can be closed, meaning that users must satisfy predetermined identity or membership requirements in order to participate.

A further embodiment of the invention provides a scheme for automatically bonding a group of devices based on the satisfaction of predetermined conditions. For example, an enterprise can require employees to participate in a WAMO while they are at a particular office location. When an employee arrives at the location and powers on his electronic device, the WAM client can automatically register the device with an on-site WAMO because the geographical condition for WAMO membership has been satisfied. Alternatively, an employer can establish temporal conditions for WAMO membership; for example, employees can be required to participate in a corporate WAMO between the hours of 7:30 am and 6:00 pm daily, so that employees that power on devices during those hours will find themselves automatically bonded in a corporate WAMO. Authorization schemes can vary with the wants and needs of the enterprise, and the enterprise can operate several WAMOs with various membership requirements.

Figure 3:
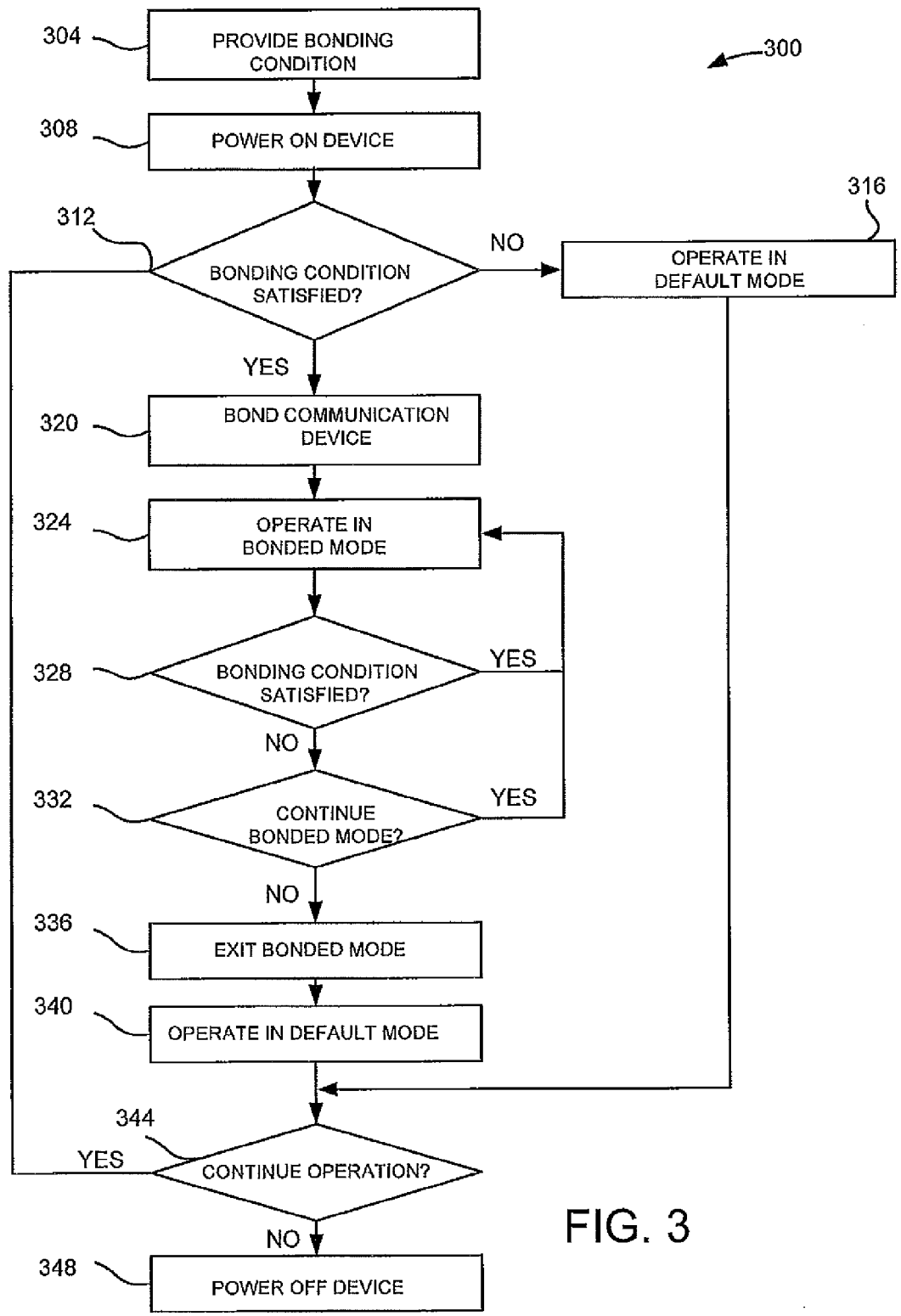
FIG. 3 shows a flowchart of a method of an exemplary embodiment of the invention.

A method 300 for automatically bonding a device to a WAMO is shown in FIG. 3. At block 304 a predetermined condition is designated. The predetermined condition can be designated by a corporate subscriber, an individual, or other entity and the WAM client on the device can be configured accordingly. The predetermined condition can be a geographical condition, for example, the device can be automatically bonded to a WAMO when the device is at a particular location such as a corporate office site. In a further embodiment, the predetermined condition is temporal so that a device is bonded to a WAMO during particular times of the day, for example 7:30 am-6:00 pm. Other predetermined conditions can be designated according to subscriber needs.

At block 308, a user powers on his device, which can be any device adapted for communication via a WAN. In an exemplary embodiment, a WAM client installed on the device is enabled when the device is powered on. A WAN connection can be established, but it is noted that a device without a WAN connection can be bonded in a WAMO and share the aggregated resources of fellow WAMMERs. At decision block 312 a decision is made whether the predetermined condition is satisfied. For geographical conditions, geographical location can be determined at the device or at the WAN network when the device enables its WAN connection and registers with the WAN network. For example, a GPS receiver located in the WAMMER computer, or network based location determination techniques as known in the art can be used to determine the location of the WAMMER. Location information can be used by the WAM client to determine whether the automatic bonding condition is satisfied. For temporal conditions, local time can be obtained from the WAN or the device. If the predetermined condition is not satisfied, the device can operate in a default mode at block 316, in which it is not automatically bonded. While in the default mode the device can operate its WAN connection in an unbonded mode until a bonding condition is satisfied at block 312, or a decision is made to discontinue operation at decision block 344 and the device is turned off at block 348. In an exemplary embodiment, a user operating a device in a default mode can be free to voluntarily bond with a WAMO. Referring back to decision block 312, if the bonding condition is satisfied, then the device is bonded to a WAMO at block 320. The WAM client on the device can register the device with a WAMO, and peer-peer communication can be established to couple the device with the control network of a WAMO, thus bonding the device to the WAMO. At block 324 the device operates in a bonded mode in which bandwidth can be dynamically aggregated among WAMMERs in the WAMO. The WAN connection of the device can be used to transfer data on behalf of a fellow WAMMER; similarly data can be transferred on behalf of the device via a fellow WAMMERs WAN connection. At decision block 328 a determination is made whether the predetermined condition remains satisfied. If so, the device continues to operate in a bonded mode at block 324. If the bonding condition is no longer satisfied, a device user can be given the choice to continue in the bonded mode decision at block 332. If the user decides to continue in the bonded mode, bonded operation can be continued at block 324, but the user can freely choose to exit the bonded mode later, if bonding conditions remain unsatisfied. If the user decides to discontinue the bonded mode, the device can exit the bonded mode at block 336. The WAM client can direct the device to drop its links to the control network, thereby removing the device from the WAMO and ending the bonded mode. At block 340, the user can operate the device in a default mode, in which he can be free to voluntarily bond with a WAMO. The user can continue operation in a default mode until a bonding condition is satisfied at block 312 or a decision is made to discontinue device operation at decision block 344. The device can be powered off at block 348.

A device enters a bonded state by communicatively coupling to a WAMO control network. Bonding with a WAMO, whether open or closed, can require a registration process, and a device can register with more than one WAMO. In a first exemplary embodiment, the registration process can be conducted by a WAMO registration server within the control network. For example, the WAMO registration server can be maintained by a WAM client or module installed on a WAMMER or be maintained at a dedicated device within the WAMO. In a further embodiment, the registration process can be performed by a WAMO registration server on the egress network. In an exemplary embodiment, a WAM client on a device can send a WAMO request message to the WAMO registration server. The WAMO registration server can perform security functions, such as authenticating credentials for devices desiring to join closed WAMOs, prior to allowing the device to join the WAMO. If allowed to join, the device is added to a WAMO Active State Table (AST) that includes current WAMO membership as well as the states of the registered members, or WAMMERs, within the WAMO. Other information, such as performance characteristics and environmental information can be requested by the WAMO registration server. If the device joins a WAMO with a designated WAMBO, the WAMO registration server can send a message identifying the WAMBO for the WAMO. Likewise, the registration server can send a message to the WAMBO identifying the newly registered WAMMER. In response, the WAMBO can send a validation message to the WAMMER to validate the WAMMER's connectivity with the WAMO control network.

State information can be updated throughout WAMO operation. In a first embodiment, state information can be broadcast by WAMMERs within the WAMO, allowing each WAMMER to maintain state information for fellow WAMMERs in the WAMO. In a further embodiment, state information can be maintained at a WAMBO, which can be a designated WAMMER or a dedicated device, and WAMMER state information is sent to the WAMBO from each WAMMER. State information can include control bandwidth capability, control network connection quality, payload network connection quality, payload latency, control latency, queuing, prioritization, class of service, quality of service, as well as other relevant information.

In an exemplary embodiment, to join or form an ad hoc WAMO, a user can establish a WAN connection and enable a WAM client. The WAM client can configure a peer-peer connection and signal to other WAM client-equipped devices a willingness to join a WAMO. In an alternative embodiment, the device can send a request to a remote WAMO registration server over its WAN connection. If a WAMO is already established, the device can register with the existing WAMO. If there is no pre-existing WAMO, a new WAMO can be established, with the initiating device listed as active in the AST while waiting for other devices to join. The AST could be maintained at a WAMMER or at a remote WAMO registration server.

To join a closed WAMO, either voluntarily or automatically, a WAM client on a device can be engaged. The WAM client can send a message to the WAMO registration server requesting membership in the closed WAMO. The WAMO registration server can validate user credentials and add the device to the AST for the WAMO, along with the device current state information. The registration server can send a message to the newly registered WAMMER identifying the WAMBO, and to the WAMBO identifying the newly registered WAMMER. The WAM client can configure the device for WAMO control network connectivity, for example as a communication connectivity between the WAMMER and the WAMBO. Connectivity within the control network can be achieved by any means including wired, wireless and fiber optic architectures. For example, community members can communicate with each other by Wi-Fi, infrared, Bluetooth, Ultrawideband, WiMax, LAN, MAN, WAN, or other networks. In exemplary embodiments, a WAN connection is not a prerequisite for membership as a WAMBO can include WAMMERs without WAN connections that rely on fellow WAMMERs with WAN connections to transfer data on their behalf.

Once a community of devices has been bonded together to form a WAMO, the aggregation and sharing of bandwidth among them can be implemented. Bandwidth aggregation can be implemented to accommodate data flow out of, i.e. uploaded from, or into, i.e. downloaded to, a WAMO. Bandwidth aggregation is the use of a WAN connection of one or more WAMMERs within the bonded community to transfer data on behalf of a fellow WAMMER within the bonded community. Data associated with a first WAMMER can be packaged and multiplexed among the one or more other WAMMERs, and their WAN connections used to transfer the data. The multiplex operation can include allocating the data to one or more designated WAMMERs within the WAMO and sending the allocated data to the designated WAMMERs. Dynamic aggregation of bandwidth as practiced by the present invention can be governed by predetermined rules and priority schemes implemented by WAM clients and WAMBOs. For example, bandwidth can be aggregated in a way that guarantees each WAMMER a predetermined percentage of the bandwidth allocated to it by its WAN provider. In an exemplary embodiment, each WAMMER can be guaranteed 100% of its own bandwidth, meaning that if a WAMMER is using its full WAN capacity, its WAN bandwidth cannot be aggregated for the use of a fellow WAMMER. Likewise, priority schemes can be established for those times in which the payload network cannot support all current WAMMER needs. For example, in a first embodiment, priority can be assigned on a temporal basis in which aggregated resources are allocated on a first-come, first-serve basis. In a further embodiment, priority can be assigned on a latency basis in which more time-sensitive operations are given priority. For example, a user wishing to engage in a video conference can be given priority over a user wishing to perform a file transfer. WAMMERs denied aggregated bandwidth can be listed in a queue state in the WAMO AST until resources become available.

The manner in which the traffic data is multiplexed, i.e. allocated and distributed among WAMMERs within the WAMO, can be dependent on the configuration of the control network within the WAMO. FIG. 4A shows a control network 400 in accordance with the invention. The control network 400 includes four WAMMERs, 402, 404, 406 and 408, each with a WWAN connection, as indicated by a wireless communication link directed to each WAMMER device. Control network 400 is an example of an ad hoc network in which the WAMMERs 402, 404, 406, 408 subscribe to various WWANs that provide various bandwidths. WAMMER 402 receives 150 kbps over its WWAN connection, WAMMER 404 receives 100 kbps, WAMMER 406 300 kbps and WAMMER 408 receives 500 kbps. Because there is no designated WAMBO, WAMBO functions, such as maintaining an AST can be performed at each WAMMER 402, 404, 406, 408, and all WAMMERs 402, 404, 406, 408 are communicatively coupled with each other as shown by the dotted lines between WAMMERs 402, 404, 406, 408. Considering first the transfer of outbound data from a WAMO, the aggregation process can begin with a WAMMER user that desires to upload data. For example, suppose WAMMER 404 wants to upload a file that requires 300 kbps of bandwidth, but it only receives 100 kbps via its WWAN connection. WAMMER 404 can check the current WAMMER states maintained in the AST to determine whether other WAMMER connections can be aggregated so as to send the data at the desired data rate. Examination of the AST reveals that WAMMER 406 is currently using all its bandwidth, WAMMER 408 is using 400 kbps of its bandwidth and WAMMER 402 is currently using 25 kbps of bandwidth. WAMMER 404 uses the state information to multiplex its data accordingly. In an exemplary embodiment, the data is wrapped in a control header and also wrapped in standard User Datagram Protocol (UDP) and Internet Protocol (IP) headers. Referring to FIG. 4A, since WAMMER 406 is currently using all its bandwidth, no data packets are sent to it from WAMMER 404. However, WAMMERs 402 and 408 do have excess bandwidth available. WAMMER 404 can send data packets to each of those WAMMERs 402, 408, for example, 100 kbps worth of data respectively. The data packets can be received at WAMMERs 402 and 408 and transmitted over the WAMMER 402 and 408 WWAN connections. WAMMER 404 can also use its own WWAN connection to transmit 100 kbps worth of data, thereby achieving an aggregated bandwidth of 300 kbps. WAMMER states can be updated to reflect their activity. Thus, in the control network 400, each WAMMER 402, 404, 406, 408 can multiplex its data among fellow WAMOs according to current WAMMER states.

Figure 4B:
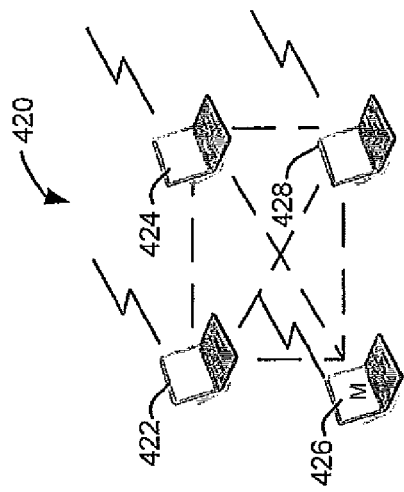
FIG. 4B illustrates an exemplary embodiment of a system in accordance with the present invention.

FIG. 4B shows a control network 420 in accordance with an exemplary embodiment of the invention. Control network 420 includes WAMMERs 422, 424, 426 and 428. Here WAMMER 426 is designated as a WAMBO for the control network 420, as indicated by the letter M. As a WAMBO, WAMMER 426 can maintain state information regarding WAMMERs 422, 424, 426 and 428. All WAMMERs 422, 424, 426, 428 are communicatively coupled to the WAMBO and with each other as depicted by the dashed lines. The aggregation process can begin with a WAMMER that desires to send outbound data traffic, for example WAMMER 422. WAMMER 422 can send an outbound data request message to the WAMBO and request current WAMMER state information. In a first embodiment, the WAMBO can respond with state information, which WAMMER 422 can use to multiplex its data among fellow WAMMERs 424, 426, 428. In a further embodiment, the WAMBO can reply with state information and a WAMMER loading scheme describing how the data can be allocated among WAMMERs 422, 424, 426, 428. WAMMER 422 can multiplex its data accordingly by sending data packets to designated WAMMERs 424, 426, 428. The WAMBO can update WAMMER states to reflect the outbound traffic loads.

Figure 4D:
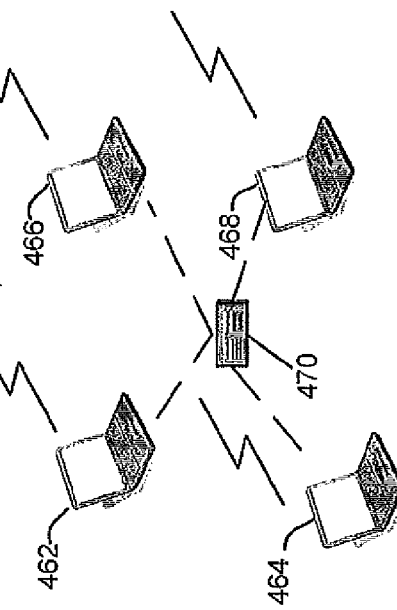
FIG. 4D illustrates an exemplary embodiment of a system in accordance with the present invention.
Figure 4A:
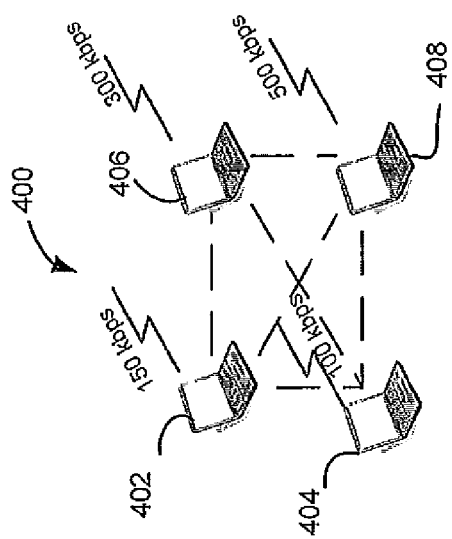
FIG. 4A illustrates an exemplary embodiment of a system in accordance with the present invention.
Figure 4C:
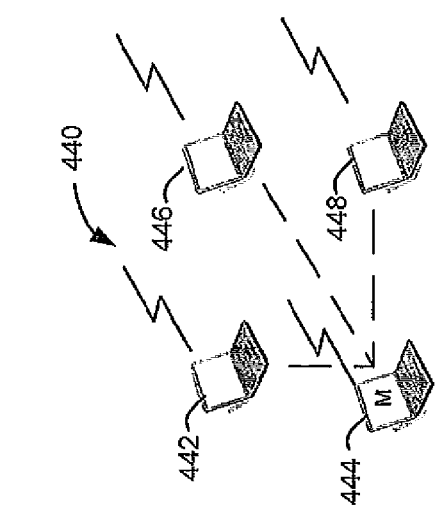
FIG. 4C illustrates an exemplary embodiment of a system in accordance with the present invention.

FIG. 4C shows a control network 440 in accordance with a further exemplary embodiment of the invention. Control network 440 includes WAMMERs 442, 444, 446 and 448, with WAMMER 444 designated as a WAMBO, as indicated by the letter M. WAMMER 444 is communicatively coupled with WAMMERs 442, 446 and 448, as indicated by the dashed lines. In control network 440, the WAMBO can multiplex all outbound traffic among WAMMERs 442, 444, 446, 448. The aggregation process can begin with an outbound data request by a WAMMER, for example WAMMER 442. The WAMBO can check the AST to determine whether bandwidth is available to transmit WAMMER 442 data traffic. If bandwidth is not available, for example, all WAMMERs 442, 444, 446, 448 are currently using all their WAN bandwidth, the outbound request is denied. WAMMER 442 can be added to a queue maintained in the AST. If bandwidth is available, the WAMBO can request that WAMMER 442 send outbound data to the WAMBO. The WAMBO can receive the outbound data, package it in data packets, multiplex the data packets among designated WAMMERs 442, 444, 446, 448 in accordance with WAMMER current state, and update WAMMER state information in the AST.

FIG. 4D shows a control network 460 in accordance with a further exemplary embodiment of the present invention. Control network 460 includes WAMMERs 462, 464, 466 and 468, and a dedicated device 470. Dedicated device 470 functions as a WAMBO for the control network 460 and is communicatively coupled to each WAMMER 462, 464, 466, 468 as indicated by the dashed lines. Operation of control network 460 is similar to that described above for control network 440; however, WAMMER outbound traffic is sent to the dedicated device 470, rather than to a master WAMMER, since the dedicated device 470 performs WAMBO functions such as maintaining state information and multiplexing outbound traffic.

Figure 5:
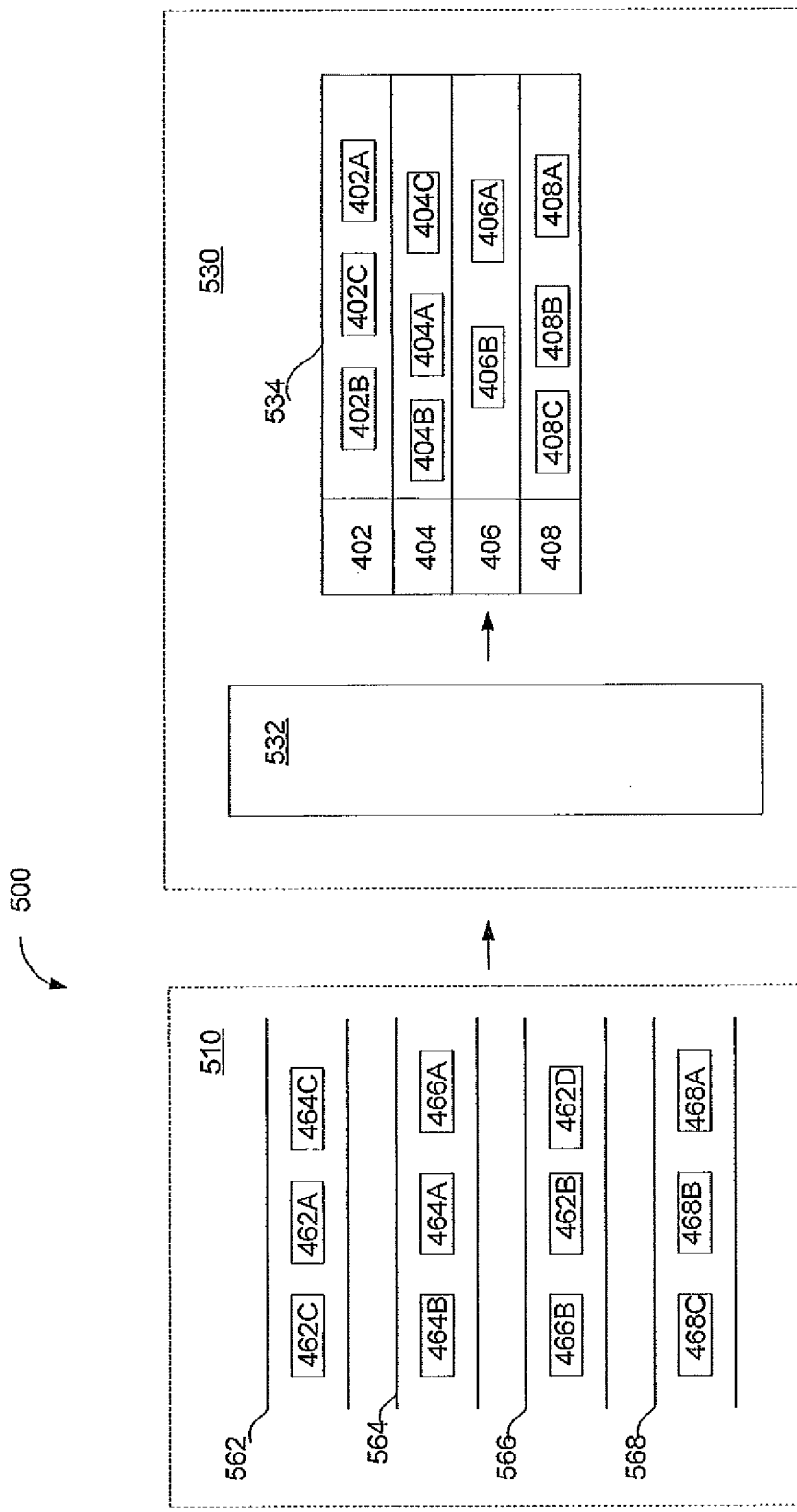
FIG. 5 shows a block diagram of a system in accordance with the invention.

The WAMMER WAN connections form the payload network 140 which is used to transport data to and from a WAMO. In the exemplary system 100 depicted in FIG. 1, outbound data from a WAMO is delivered by the payload network 140 to an egress network 160 which includes a WAMMAN 162. The WAMMAN 162 can receive data packets delivered over various WANs. In an exemplary embodiment, a WAMMAN 162 of the invention can buffer incoming data packets received from the payload network 140, and reconstruct the traffic data streams for each WAMMER so that the data streams can be delivered to an external network. Referring to FIGS. 4D and 5, FIG. 5 shows an exemplary embodiment of the invention 500 in which multiplexed data sent by WAMMERs 462, 464, 466 and 468 is reassembled. FIG. 5 shows a payload network 510 and an egress network 530 that includes a WAMMAN 532. The payload network 510 includes WAN channels 562, 564, 566 and 568, representing the WAN channels provided to WAMMERs 462, 464, 466 and 468 respectively. Data packets are shown within the WAN channels 562, 564, 566 and 568, with numbers designating the WAMMER 462, 464, 466, 468 whose traffic data is contained within the packet, and letters representing the sequential position of each data packet within the traffic data stream associated with a particular WAMMER 462, 464, 466, 468. For example, channel 562 contains a data packet identified as 462A, indicating that the data packet has data that originated at WAMMER 462, and is the first data packet in the stream. Thus, when the traffic stream for WAMMER 462 is reassembled, the data packets can be properly sequenced. As shown in FIG. 5, the WAMMAN 532 can receive incoming data streams and store them by WAMMER in a buffer 534. The WAMMAN 532 can reassemble the data streams for each WAMMER 462, 464, 466, 468 and the egress network 530 can deliver them to an external network such as an intranet or the internet. Data can be delivered to an external network by wired, wireless, optical fiber, or other communication schemes.

Figure 6:
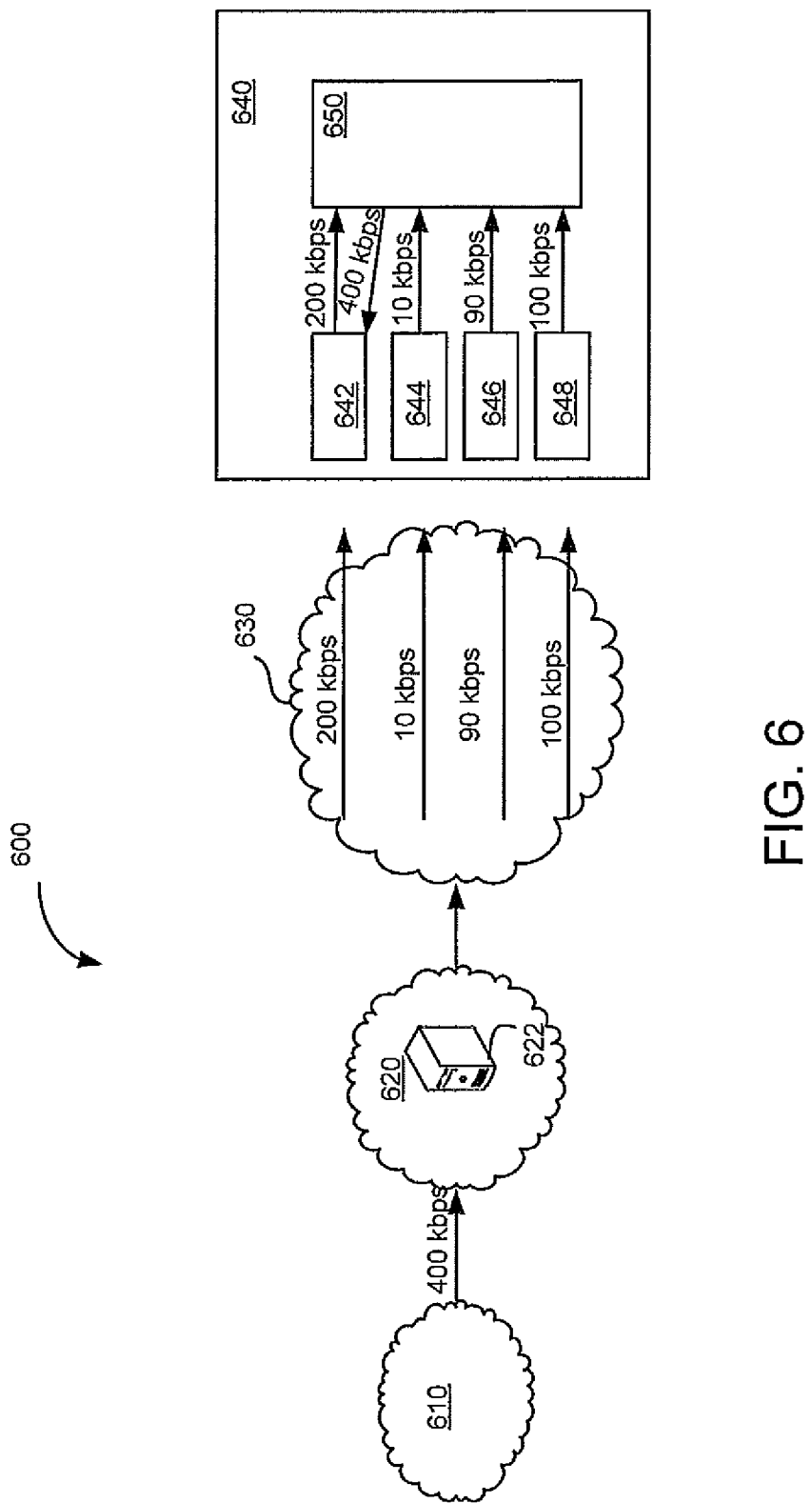
FIG. 6 illustrates a system of an exemplary embodiment of the invention.

The discussion above pertained to the aggregation of bandwidth to deliver outbound data from a WAMO. FIG. 6 shows an exemplary embodiment of a system of the invention 600 for aggregating bandwidth to transfer inbound data to a WAMO. FIG. 6 shows an external network 610, an egress network 620 that includes a WAMMAN 622, a payload network 630, and a control network 640. The control network includes WAMMERs 642, 644, 646 and 648, each with a WAN bandwidth of 200 kbps, and a WAMBO 650 shown as a dedicated device. A data stream intended for WAMMER 642 and requiring a 400 kbps data rate, can be delivered to the WAMMAN 622 in the egress network 620. The WAMMAN 622 can check the current states of the WAMMERs in the WAMO in which WAMMER 642 is registered to determine whether there bandwidth can be aggregated to download the file to WAMMER 642. In a first exemplary embodiment, current WAMMER states are maintained at the WAMMAN. In a further embodiment, WAMMER states can be obtained from the WAMBO 650 via control communications between the WAMMAN and the WAMBO. In an exemplary embodiment control communications can be facilitated by the payload network 630.

As an example, examination of the state information can reveal that WAMMER 648 is currently using half its WAN bandwidth, WAMMER 646 is using 110 kbps of bandwidth, WAMMER 644 is using 190 kbps of bandwidth, and WAMMERs 642 is using none of its available WAN bandwidth. Using the WAMMER state information, the WAMMAN 622 can multiplex the data intended for WAMMER 642 among the WAMMERs 642, 644, 646 and 648. As shown in FIG. 6, the WAMMAN 622 can send 200 kbps of data to WAMMER 642, 10 kbps of data to WAMMER 644, 90 kbps of data to WAMMER 646, and 100 kbps of data to WAMMER 648, for a total of 400 kbps. The bandwidth aggregation method of the present invention can satisfy the communication requirements of a bonded device without adversely affecting the performance of other bonded devices. The WAMMERs 642, 644, 646 and 648 can receive the data intended for WAMMER 642 and introduce it to the control network 640.

The control network 640 is configured with a WAMBO 650 that manages all incoming data. Consequently the WAMMERs 642, 644, 646, 648 send all data packets received from the payload network 630 to the WAMBO 650. The WAMBO 650 can receive the data packets and route them to WAMMER 642. WAMMER 642 can receive the data packets from the WAMBO 650, unwrap the control headers to extract the actual data, and forward the data to the appropriate application. As shown in FIG. 6, the dynamic aggregation of bandwidth performed by the methods of the invention allows WAMMER 642 to achieve a download data rate of 400 kbps, considerably higher than the 200 kbps data rate that can be provided by its own WAN connection.

The configuration of a WAMO control network can affect the manner in which data packets are delivered to the appropriate WAMMER. The paragraphs above described data delivery in a control network 640 with a WAMBO 650 in the form of a dedicated device that can receive all inbound traffic. Data can be delivered in a similar manner in the control network 440, shown in FIG. 4C, in which a designated master WAMMER functions as a WAMBO; i.e. all incoming data packets received at WAMMERs 442, 444, 446 and 448 can be sent to the WAMBO which routes the packets to the intended WAMMERs. In a further exemplary embodiment, WAMMERs in a control network that include a WAMBO can retain data packets intended for them and forward data packets intended for fellow WAMMERs to the WAMBO for distribution.

An exemplary embodiment of the invention can include the control network 400, shown in FIG. 4A, in which there is no designated master WAMMER, and each WAMMER 402, 404, 406, 408 performs WAMBO functions. In this embodiment, each WAMMER 402, 404, 406, 408 can examine data packets received from the payload network, retain data packets intended for itself, and route data packets that are intended for a fellow WAMMER 402, 404, 406, 408 to the appropriate WAMMER 402, 404, 406, 408. In an embodiment that includes a control network 420, as shown in FIG. 4B, all data can be sent to WAMMER 426, the designated WAMBO, for routing and forwarding to the proper WAMMER 422, 424, 426, 428. In an alternative embodiment using the control network 420, each WAMMER 422, 424, 426, 428 can route incoming data to the proper WAMMER 422, 424, 426, 428 via the communication paths between WAMMERs 422, 424, 426, 428.

Figure 7:
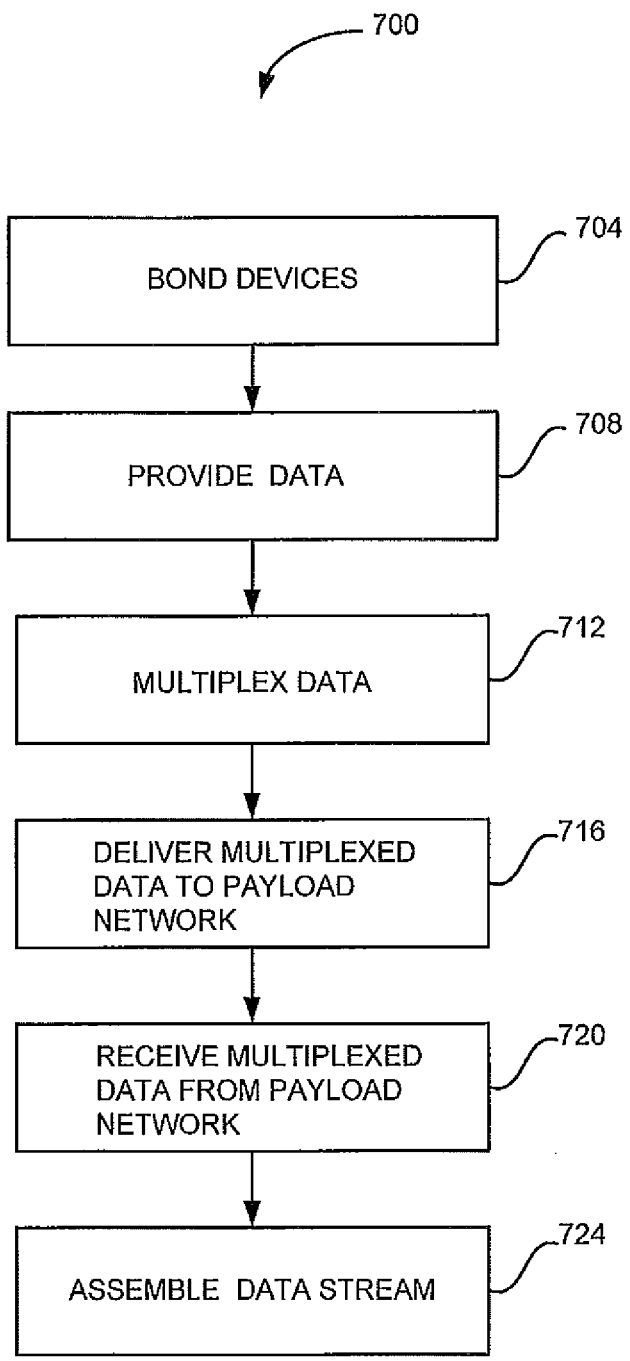
FIG. 7 shows a flowchart of a method of an exemplary embodiment of the invention.

FIG. 7 shows a flowchart for an exemplary method 700 of the invention. At block 704, devices are bonded to create a WAMO community. A bonded WAMO community includes communication devices with WAN connections, and can also include communication devices without a WAN connection. Bonded WAMMERs are coupled with a control network that manages data flow into and out of the WAMO. As discussed previously, a device can voluntarily join a WAMO, or be automatically enrolled in a WAMO when a predetermined condition is satisfied. To join a WAMO and become a bonded WAMMER, a device can register with a WAMO registration server. The registration server can reside at the WAMO control network, the egress network, or at the carrier network. As an example, FIG. 4D shows a control network 460 for a WAMO that includes bonded WAMMERs 462, 464, 466, and 468 and a dedicated device 470, which functions as a WAMBO for the WAMO. In the example at hand the WAMO is a closed corporate WAMO established at a corporate field office. Each WAMMER has a 250 kbps WWAN bandwidth supplied by the users' employer.

At block 708, a data is provided. The data can originate at a WAMMER 462, 464, 466, 468 within the control network 460, or originate at an external network. For the sake of example, assume the data originates at WAMMER 464 and requires a 500 kbps bandwidth. At block 712 the data is multiplexed among WAMMERs 462, 464, 466, 468 in the WAMO. WAMMER 464 can send an outbound data request to the WAMBO, shown as dedicated device 470. The WAMBO can check the current states of the WAMMERs in the WAMO, to determine whether there is payload bandwidth not currently in use. If there is bandwidth available, the WAMBO can request the data from WAMMER 464. The WAMBO can multiplex the data in data packets that are allocated and distributed among designated WAMMERs 462, 464, 466, 468. At block 716 the data packets are delivered to a payload network via the designated WAMMER WWAN connections. At block 720 the data packets are received at an egress network, such as the egress network 530 shown in FIG. 5. The data packets can be received at WAMMAN 532, which can be an application installed on a WAMO server, within the egress network 530. At block 724 the WAMMAN 532 can buffer the data packets for each WAMMER 462, 464, 466, 468 as shown in FIG. 5 and reconstruct the original data sequence. The reconstructed data can then be delivered to an external network such as a corporate intranet or the internet.

Figure 8:
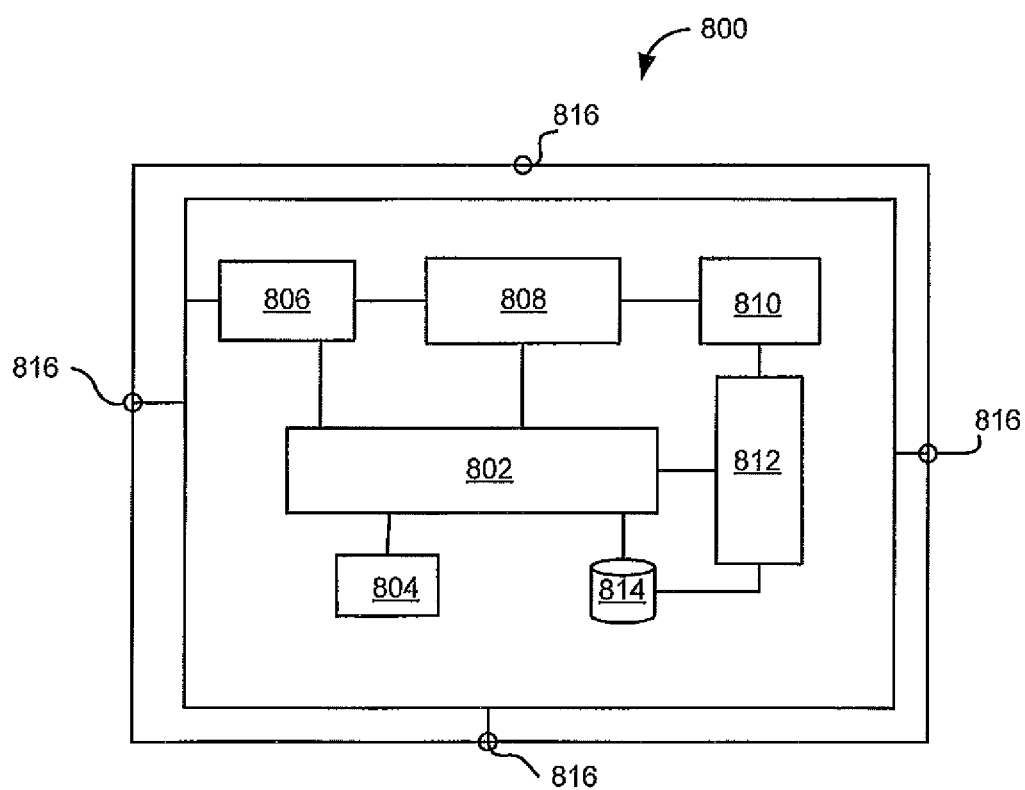
FIG. 8 illustrates an apparatus of an exemplary embodiment of the invention.

The present invention can be implemented by software, hardware or a combination of hardware and software. For example, in an exemplary embodiment, WAM operations by a WAMMER can be directed by a WAM module installed on the WAMMER device. The invention can be embodied by a software client, hardware or a combination of hardware and software. The invention can also be embodied as a dedicated device that performs WAMBO functions. FIG. 8 shows a WAM module 800 in accordance with the invention that can perform WAMBO functions as a dedicated device and includes both hardware and software. The WAM module 800 can include: a controller 802 to direct the WAM module 800 operations, a memory 804 to store instructions for the controller 802, a communication module 806 to provide communications circuits that allow the WAM module 800 to communicate with WAMMERs within a WAMO, a processor 808 to receive data traffic from the communications module 806 and perform multiplexing operations, a buffer 810 which can be used by processor 808 to store data, a database 814 to store WAMMER state information, and ports 816 that allow the module 800 to be coupled to WAMMERs by wired or fiber optic means. The WAM module 800 can also include a registration module which can implement the registration process by which a device can join a WAMO.

The communications module 806 can include a transmitter, receiver, and related circuitry as known in the art that can facilitate communication by wired, wireless or fiber optic means. For example, the communications module 806 can contain a Wi-Fi transmitter and receiver. The processor 808 can be coupled to the communications module 806 and thereby receive WAMMER traffic data. For inbound data, the processor 808 can read the control headers on the data packets and route the data to the appropriate WAMMER via the communications module 806. For outbound data, the processor 808 can package the outbound data in data packets that can be sent to designated WAMMERs via the communications module 806. The processor 808 can be coupled with the buffer 810 which can store inbound or outbound traffic data. The controller 802 can be coupled to the communications module 806 and thereby receive control and state information from WAMMERs within a WAMBO. In addition, the controller can be coupled to the database 814 which can be used to store state information received from the WAMMERs. The registration module 812 can also be coupled with the database 814 so as to access and update stored WAMMER state information.

The present invention provides systems, methods and apparatus for dynamically aggregating WAN bandwidth within a bonded community of electronic communication devices in order to effectively increase the bandwidth at a particular device within the community. Bandwidth aggregation is performed in accordance with the communication requirements and active states of the bonded devices within the community and can be practiced under a variety of schemes. The present invention is particularly applicable to wirelessly aggregating bandwidth provided by the WWAN connections of a bonded community of devices. The systems and methods of the invention facilitate maximizing the utilization of WAN resources in a cost-effective manner while providing users with the bandwidth necessary to conduct desired operations.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
communicatively coupling a plurality of communication devices to a control network, each of the plurality of communication devices having a control network connection to each of other communication devices of the plurality of communication devices, and each of at least a subset of the plurality of communication devices having a wide area network connection to a wide area communication network, each wide area network connection having a wide area network connection bandwidth;
parceling first data into data packets, wherein the first data is outgoing data associated with a first one of the plurality of communication devices, wherein the parceling is determined based on available bandwidths of the wide area network connections;
distributing respective ones of the data packets to respective ones of the at least a subset of the plurality of communication devices; and
delivering the data packets from the respective ones of the at least a subset of the plurality of communication devices over respective ones of the wide area network connections.

2. The method of claim 1, wherein at least one of the communication devices is wirelessly connected to the control network.

3. The method of claim 1, wherein the wide area communication network comprises a wireless wide area communication network.

4. The method of claim 1, wherein the communicatively coupling the plurality of communication devices includes satisfying at least one of a geographical condition and a temporal condition.

5. The method of claim 1, comprising transmitting the first data from the first one of the plurality of communication devices to a control network controller, wherein the control network controller is communicatively connected to each of the plurality of communication devices by control network connections; and
wherein each of the parceling operation and the distributing operation is performed by the control network controller, wherein the distributing operation is from the control network controller to respective ones of each of the at least a subset of the plurality of communication devices over respective ones of the control network connections.

6. The method of claim 5, comprising determining, by the control network controller, the available bandwidths of the wide area network connection of each of the at least a subset of the plurality of communication devices.

7. The method of claim 1, wherein the parceling is further based on control network connection bandwidths.

8. The method of claim 1, wherein each of the parceling operation and the distributing operation is performed by the first one of the plurality of communication devices; and
wherein the first one of the plurality of communication devices distributes the data packets from the first one of the plurality of communication devices to respective ones of the at least a subset of the plurality of communication devices over respective ones of the control network connections.

9. The method of claim 8, comprising determining, by the first one of the plurality of communication devices, the available bandwidths of the wide area network connection of each of the at least a subset of the plurality of communication devices.

10. The method of claim 1, further comprising receiving the data packets and reconstructing the first data.

11. The method of claim 10, further comprising delivering the reconstructed first data to an external network.

12. The method of claim 1, wherein the operation of initiating delivering the data packets includes initiating delivering the data packets to an egress network from the at least a subset of the plurality of communication devices over respective ones of the wide area network connections.

13. The method of claim 1, wherein the parceling is further based on state information including at least one of: control bandwidth capability, control network connection quality, payload network connection quality, payload latency, control latency, queuing, prioritization, class of service, and quality of service.

14. The method of claim 1, wherein the operation of communicatively coupling includes registering at least one of the plurality of communication devices with a registration server.

15. A system, comprising:
a processor; and
computer-executable instructions that, when executed by the processor, cause the processor to perform operations comprising:
communicatively coupling a plurality of communication devices to a control network, each of the plurality of communication devices having a control network connection to each of other communication devices of the plurality of communication devices, and at least a subset of the plurality of communication devices having a wide area network connection to a wide area communication network, each wide area network connection having a wide area network connection bandwidth;
initiating parceling of first data associated with a first one of the plurality of communication devices into data packets, wherein the parceling is determined based on available bandwidths of the wide area network connections;
initiating distributing the data packets to respective ones of the at least a subset of the plurality of communication devices; and
initiating delivering the data packets from the respective ones of the at least a subset of the plurality of communication devices over respective ones of the wide area network connections.

16. The system of claim 15, wherein:
the operation of communicatively coupling comprises wirelessly communicatively coupling at least one of the plurality of communication devices to the control network; and
the wide area communication network comprises a wireless wide area communication network.

17. The system of claim 15, wherein the operation of communicatively coupling the plurality of communication devices includes satisfying at least one of:
a geographical condition; and
a temporal condition.

18. A tangible non-transitory computer-readable storage device comprising computer-executable instructions that, when executed by a processor, cause the processor to perform operations comprising:
communicatively coupling a plurality of communication devices to a control network, each of the plurality of communication devices having a control network connection to each of other communication devices of the plurality of communication devices, and at least a subset of the plurality of communication devices having a wide area network connection to a wide area communication network, each wide area network connection having a wide area network connection bandwidth;
initiating parceling of first data associated with a first one of the plurality of communication devices into data packets, wherein the parceling is determined based on available bandwidths of the wide area network connections;
initiating distributing the data packets to respective ones of the at least a subset of the plurality of communication devices; and
initiating delivering the data packets from the respective ones of the at least a subset of the plurality of communication devices over respective ones of the wide area network connections.

19. The tangible non-transitory computer-readable storage device of claim 18, wherein:
the operation of communicatively coupling comprises wirelessly communicatively coupling at least one of the plurality of communication devices to the control network; and
the wide area communication network comprises a wireless wide area communication network.

20. The tangible non-transitory computer-readable storage device of claim 18, wherein the operation of communicatively coupling the plurality of communication devices includes satisfying at least one of:
a geographical condition; and
a temporal condition.

\* \* \* \* \*